No. 860,162. PATENTED JULY 16, 1907.
J. A. TOWNSEND.
NUT LOCK.
APPLICATION FILED JULY 6, 1906.
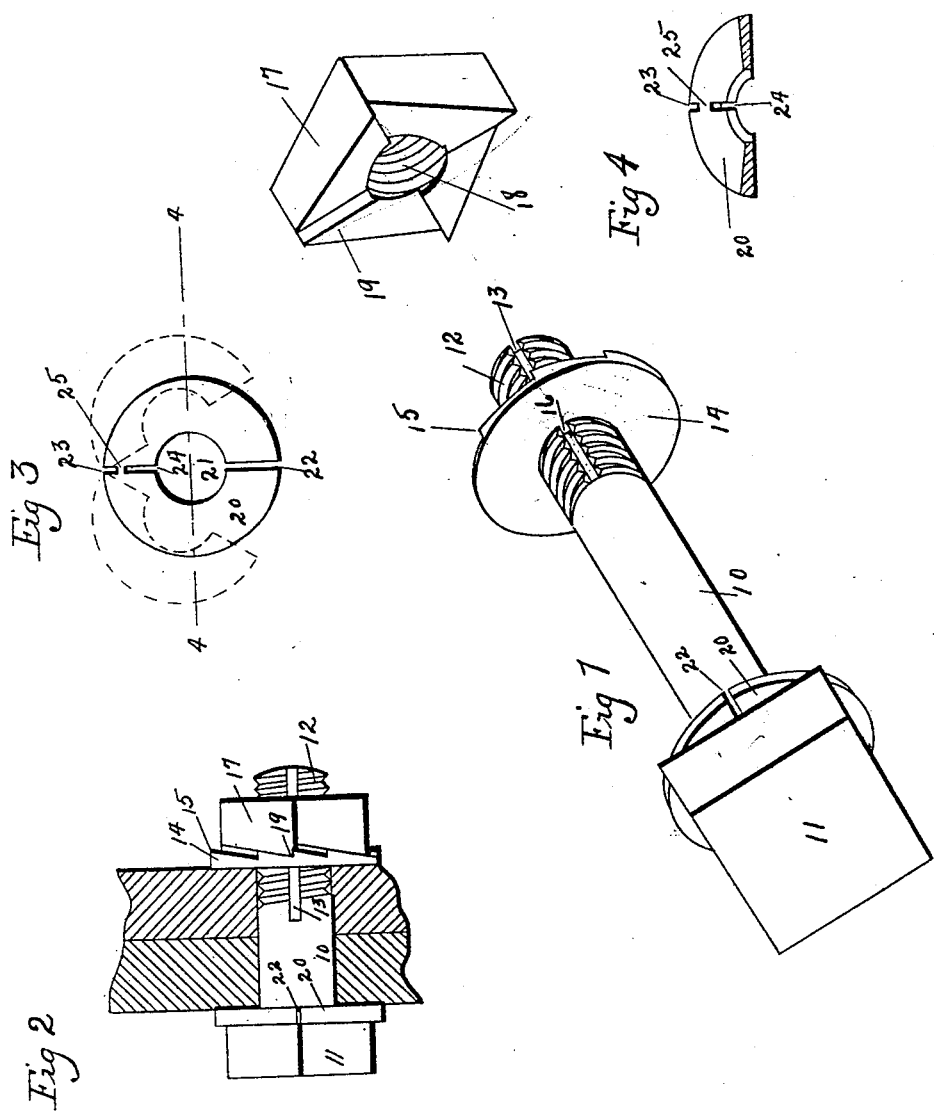
Witnesses.
G. C. Stirling
K. K. Keffer
Inventor
Joseph A. Townsend.
by Orwig & Lane
Attys

UNITED STATES PATENT OFFICE.

JOSEPH A. TOWNSEND, OF BLAKESBURG, IOWA.

NUT-LOCK.

No. 860,162.  Specification of Letters Patent.  Patented July 16, 1907.

Application filed July 6, 1906. Serial No. 325,393.

*To all whom it may concern:*

Be it known that I, JOSEPH A. TOWNSEND, a citizen of the United States, residing at Blakesburg, in the county of Wapello and State of Iowa, have invented a certain new and useful Nut-Lock, of which the following is a specification.

The object of my invention is to provide a nut lock of simple, durable and inexpensive construction by which a nut may be securely held against rotation and yet when it is desired to remove the nut it may be very easily and quickly accomplished by first removing a split washer so arranged that it may be very easily driven out of position to thereby allow the nut to slightly spread from the locking washer so that the nut may be unscrewed or removed without damaging the bolt, the nut or the locking washer.

My invention consists in the construction of the split washer and its arrangement and combination relative to certain parts of the device, whereby the objects contemplated are attained, as hereinafter more fully set forth, pointed out in my claims and illustrated in the accompanying drawings, in which—

Figure 1 shows a perspective view of a bolt having thereon a split washer embodying my invention and also having thereon a locking washer and a nut adjacent to the end of the bolt. Fig. 2 shows a sectional view of two articles clamped together by means of a device embodying my invention. Fig. 3 shows a plan view of a split washer, the dotted lines in said figure show the positions of the parts thereof when separated, and Fig. 4 shows a sectional view of the split washer on the line 4—4 of Fig. 3.

Referring to the accompanying drawings, I have used the reference numeral 10 to indicate the body of the bolt having at one end a head 11 and at the other end a screw threaded portion 12 provided with a longitudinal groove 13.

The locking washer comprises a flat disk 14 with one face provided with ratchet teeth 15 arranged on radial lines, said washer is also provided with a lug 16 to enter the groove 13.

The nut is of the ordinary form and comprises a body portion 17 with a screw threaded opening 18 and a series of radial ratchet teeth 19. I preferably provide four ratchet teeth on the nut and eight ratchet teeth on the locking washer.

The split washer comprises a disk-shaped body portion 20 of non-resilient metal with a central opening 21 and a radial cut in one side 22 and two radial notches 23 and 24 in the other side with a narrow connecting piece 25 joining the sides between said notches. One face of the washer is beveled from a maximum thickness at its periphery to a minimum thickness at the central opening. In assembling the parts, I place the washer with its flat face against the object to be clamped by the bolt and its beveled face against either the head of the bolt 11 or the flat face of the locking washer 14. The nut is then screwed to the bolt in the ordinary way until the ratchet teeth thereof engage the ratchet teeth of the locking washer and when in this position, obviously the nut is firmly locked. If at any time it should be desired to remove the nut, the operator forces the sides of the split washer apart until the washer may be removed from the bolt. This is very easily accomplished on account of the beveled face of the washer because it is only necessary to start the spreading movement of the sides of the washer and then the remainder of the movement required for detaching the washer may be easily accomplished on account of the beveled feature of the washer. As soon as the washer is removed either the bolt or the locking washer may be moved as required to slightly separate the locking washer and the nut, which may be unscrewed in the ordinary way and none of the parts including the bolt, the locking washer and nut, will be injured, although in order to use the device a second time, it will be necessary to either bend the split washer back to its original position or else provide a new one. However, they are quite inexpensive and it is not necessary to exercise care in their removal.

Having thus described my invention, what I claim and desire to secure by Letters Patent of the United States, therefor is—

1. In a device of the class described, the combination of a screw threaded bolt, a locking washer slidingly and non-rotatably mounted thereon, a locking nut to be screwed on the bolt and to co-act with the locking washer and a non-resilient split washer on the bolt between its head and the locking washer, said split washer having a slot through one side and a notch extending partially through the other side whereby the sides may be easily forced apart.

2. In a device of the class described, the combination of a screw-threaded bolt provided with a longitudinal groove, a ratchet-faced washer having a lug to enter the groove, a ratchet-faced nut to co-act with the washer, a split washer tapered from its periphery toward its center and having a radial slot extended through one side and having two radial notches at the diametrically opposite side, substantially as set forth.

JOSEPH A. TOWNSEND.

Witnesses:
 A. F. ROSE,
 H. R. CUNNINGHAM.